(12) United States Patent
Sadaka (10) Patent No.: US 11,476,643 B2
(45) Date of Patent: Oct. 18, 2022

(54) INTERNAL COMBUSTION ENGINE COMPONENT AND METHOD OF MANUFACTURING INTERNAL COMBUSTION ENGINE COMPONENT

(71) Applicant: NGK SPARK PLUG CO., LTD., Nagoya (JP)

(72) Inventor: Naoki Sadaka, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 39 days.

(21) Appl. No.: 16/668,594

(22) Filed: Oct. 30, 2019

(65) Prior Publication Data

US 2020/0153207 A1 May 14, 2020

(30) Foreign Application Priority Data

Nov. 8, 2018 (JP) .............................. JP2018-210931
Jul. 16, 2019 (JP) .............................. JP2019-131353

(51) Int. Cl.
*H01T 13/00* (2006.01)
*H01T 13/02* (2006.01)
(Continued)

(52) U.S. Cl.
CPC ............ *H01T 13/02* (2013.01); *B23K 26/359* (2015.10); *C23C 26/00* (2013.01); *H01T 13/32* (2013.01);
(Continued)

(58) Field of Classification Search
CPC ....... H01T 13/02; H01T 13/00; B23K 26/359; B23K 26/352
See application file for complete search history.

(56) References Cited

U.S. PATENT DOCUMENTS 5,976,674 A * 11/1999 Sugimoto ............. C04B 41/009
428/210
6,214,150 B1 * 4/2001 Sugimoto ............. B44C 1/1712
428/914
(Continued)

FOREIGN PATENT DOCUMENTS

CN 202602085 U 12/2012
EP 1 517 417 A2 3/2005
(Continued)

OTHER PUBLICATIONS

Notice of Reasons for Refusal issued in connection with Japanese Patent Application No. 2019-131353, dated Sep. 29, 2020 (with English language machine translation).
(Continued)

*Primary Examiner* — Phutthiwat Wongwian
*Assistant Examiner* — Sherman D Manley
(74) *Attorney, Agent, or Firm* — Kusner & Jaffe (57) ABSTRACT

A spark plug that prevents a decrease in strength of a member to which a mark is attached while ensuring a readability of the mark, and a method of manufacturing the spark plug. The spark plug is configured to ignite an air-fuel mixture in an internal combustion engine. The spark plug includes: a mark formed of an oxide film generated on a surface of a metallic member or is formed of the metallic member and the oxide film; and a coating material covering the whole mark and allowing transmission of light.

11 Claims, 6 Drawing Sheets

(51) Int. Cl.
*C23C 26/00* (2006.01)
*H01T 13/32* (2006.01)
*B23K 26/359* (2014.01)
*H01T 21/02* (2006.01)
*H01T 13/38* (2006.01)
*H01T 13/39* (2006.01)

(52) U.S. Cl.
CPC .............. *H01T 21/02* (2013.01); *H01T 13/38* (2013.01); *H01T 13/39* (2013.01)

(56) References Cited

U.S. PATENT DOCUMENTS

| | | | | |
|---|---|---|---|---|
| 6,310,430 | B1* | 10/2001 | Moriya | H01T 13/20 313/142 |
| 8,543,283 | B2* | 9/2013 | Boss | G06Q 10/20 340/568.1 |
| 9,190,812 | B2* | 11/2015 | Miyashita | H01T 13/08 |
| 9,375,946 | B2* | 6/2016 | Zhang | C25D 11/243 |
| 10,286,628 | B2* | 5/2019 | Timmerman | G09F 3/02 |
| 2003/0071020 | A1* | 4/2003 | Hong | C23C 14/28 219/121.68 |
| 2003/0192780 | A1* | 10/2003 | Ala-Kleme | G01N 21/76 204/291 |
| 2004/0020380 | A1* | 2/2004 | Tanaka | B41F 17/22 101/38.1 |
| 2004/0164302 | A1* | 8/2004 | Arai | G06K 19/07749 257/E29.295 |
| 2006/0113370 | A1* | 6/2006 | Taylor | G06Q 10/08 235/375 |
| 2010/0155475 | A1* | 6/2010 | Paek | G06Q 10/08 235/439 |
| 2011/0088924 | A1* | 4/2011 | Nashner | B41M 5/262 205/333 |
| 2012/0000074 | A1* | 1/2012 | PazosSchroeder | B26B 21/443 30/34.05 |
| 2012/0144680 | A1 | 6/2012 | Scillia et al. | |
| 2013/0011587 | A1* | 1/2013 | Kim | C08J 3/226 428/323 |
| 2013/0222116 | A1* | 8/2013 | Barry, III | G06Q 10/087 340/10.1 |
| 2014/0027412 | A1* | 1/2014 | Kato | B23K 26/18 219/121.61 |
| 2016/0260360 | A1* | 9/2016 | Ueda | C08J 7/043 |
| 2018/0331511 | A1* | 11/2018 | Maki | H01T 13/32 |

FOREIGN PATENT DOCUMENTS

| | | |
|---|---|---|
| JP | S49-1727 A | 1/1974 |
| JP | H05-269584 A | 10/1993 |
| JP | 3078913 U | 5/2001 |
| JP | 2003-040265 A | 2/2003 |
| JP | 2012-128948 A | 7/2012 |
| JP | 2012-152546 A | 8/2012 |
| JP | 2014-111816 A | 6/2014 |

OTHER PUBLICATIONS

Office Action issued in corresponding Indian Patent Application No. 201914044357 dated Nov. 9, 2021.

* cited by examiner

INTERNAL COMBUSTION ENGINE COMPONENT AND METHOD OF MANUFACTURING INTERNAL COMBUSTION ENGINE COMPONENT

FIELD OF THE INVENTION

The present disclosure relates to an internal combustion engine component and a method of manufacturing the internal combustion engine component, specifically to an internal combustion engine component to which a mark is attached and a method of manufacturing the internal combustion engine component to which a mark is attached.

BACKGROUND OF THE INVENTION

There has been proposed a technique in which a predefined identifier (mark) is attached to an industrial product so that history information of the industrial product can be tracked across procurement, processing, production, distribution, sales, disposal, and the like. Even in a spark plug that ignites an air-fuel mixture in an internal combustion engine, it is required to attach the mark in order to increase traceability. As a technique for attaching the mark to the industrial product, Japanese Utility Model Registration No. 3078913 ("PTL 1") discloses a technique of printing a mark by irradiating a surface of a ceramic substrate with a laser beam.

SUMMARY OF THE INVENTION

In the above-described related-art technique, since a mark is carved by irradiating the surface of the ceramic substrate, which is a brittle material, with a laser beam, it is possible to form a mark that is easy to be read. However, the mark may become a starting point of breakage of the substrate, and there is concern that strength of a member to which the mark is attached may decrease.

Therefore, illustrative aspects of the present disclosure relate to provide a spark plug, which can prevent a decrease in strength of the member to which the mark is attached while ensuring a readability of the mark, and a method of manufacturing the spark plug.

The present disclosure discloses, for example, the following application examples.
<Application Example 1>
An internal combustion engine component, a part of the component being composed of a metallic member, the component comprising: a mark that is formed of an oxide film generated on a surface of the metallic member or is formed of the metallic member and the oxide film; and a coating material covering the whole mark and allowing transmission of light.

According to this configuration, since the mark is formed of the oxide film generated on the surface of the metallic member or is formed of the metallic member and the oxide film, it is possible to prevent a decrease in strength of a member to which the mark is attached, as compared with a case where the mark is attached to a ceramic member.

Further, since the oxide film or the metallic member forming the mark is covered with the coating material, it is possible to prevent the oxide film or the metallic member from rusting by touching the open air. As a result, the oxide film or the metallic member can be prevented from discoloring due to rust or the like, and a readability of the mark can be prevented from decreasing. Therefore, it is possible to prevent the decrease in the strength of the member to which the mark is attached while ensuring the readability of the mark.

The coating material is formed of a material capable of transmitting light. The light at this time may include light having various wavelengths. For example, infrared rays, visible light, and ultraviolet rays may be included. When the mark is visually confirmed, a material capable of transmitting visible light may be used. When the mark is read by a code reader and confirmed, a material capable of transmitting light that can be read by the code reader may be used.
<Application Example 2>
The internal combustion engine component according to the application example 1, wherein the whole outermost edge of the coating material on the surface of the metallic member is located outside an outermost edge of the mark.

According to this configuration, since the oxide film and the metallic member forming the mark are more reliably covered by the coating material, the oxide film or the metallic member can be further prevented from discoloring due to rust or the like, and the readability of the mark can be further prevented from decreasing. As a result, it is possible to prevent the decrease in the strength of the member to which the mark is attached while ensuring the readability of the mark.
<Application Example 3>
The internal combustion engine component according to the application example 1 or 2, wherein an uneven portion is provided about the mark in the surface of the metallic member, and the coating material covers the uneven portion.

According to this configuration, it can be made hard to peel off the coating material by covering the uneven portion with the coating material.
<Application Example 4>
The internal combustion engine component according to any one of the application examples 1 to 3, wherein a caved portion is formed on the surface of the metallic member, and wherein the mark is formed on a bottom surface of the caved portion.

According to this configuration, since the coating material covers the mark formed on the bottom surface of the caved portion, it can be made hard to peel off the coating material as compared with a case where the coating material is applied to a plane.
<Application Example 5>
The internal combustion engine component according to the application example 4, wherein the outermost edge of the coating material is located inside an outermost edge of the caved portion.

According to this configuration, an application range of the coating material can be determined by the caved portion as compared with a case where the coating material is disposed by spreading in a surface.
<Application Example 6>
The internal combustion engine component according to any one of the application examples 1 to 5, wherein the internal combustion engine component is a spark plug configured to ignite an air-fuel mixture in an internal combustion engine.

According to this configuration, it is possible to prevent the decrease in the strength of the member attached with the mark formed on the metallic member forming a part of the spark plug while ensuring the readability of the mark.
<Application Example 7>
The internal combustion engine component according to the application example 6, wherein the internal combustion engine component is a spark plug, the spark plug extending in an axial direction from a front end side to a rear end side and comprising a metal shell comprising a projection portion projecting radially outward over the entire circumference thereof, wherein the projection portion has: a front end side facing surface that is locked directly or via a gasket to the engine head when being assembled to an engine; and a mark forming surface on which the mark is formed adjacent to a rear end side of the front end side facing surface, and wherein a maximum thickness part of the coating material is located on a rear end side of a center of the mark in a direction along the mark forming surface, a thickness of the coating material being maximum at the maximum thickness part.

According to this configuration, since the maximum thickness part is disposed at a relatively distant position from the front end side facing surface which is a locking surface with the engine head, the coating material is prevented from adhering to the front end side facing surface at the time of application or drying of the coating material. As a result, airtightness between the engine head and the front end side facing surface can be ensured.

<Application Example 8>

The internal combustion engine component according to the application example 6 or 7, wherein the internal combustion engine component is a spark plug, the spark plug extending in an axial direction from a front end side to a rear end side and comprising a projection portion projecting radially outward over the entire circumference thereof, wherein the projection portion has: a front end side facing surface that is locked directly or via a gasket to the engine head when being assembled to an engine; and a mark forming surface on which the mark is formed adjacent to a rear end side of the front end side facing surface, and wherein a maximum thickness part of the coating material is located outside an outermost edge of the mark in a direction along the mark forming surface, a thickness of the coating material being maximum at the maximum thickness part.

According to this configuration, variation in a thickness of a portion of the coating material disposed on the mark can be reduced as compared with a case where the maximum thickness portions are inside the outermost edge of the mark. Therefore, visibility of the mark can be further improved.

<Application Example 9>

The internal combustion engine component according to any one of the application examples 6 to 8, wherein the internal combustion engine component is a spark plug, the spark plug extending in an axial direction from a front end side to a rear end side and comprising a projection portion projecting radially outward over the entire circumference thereof, wherein the projection portion has: a front end side facing surface that is locked directly or via a gasket to the engine head; and a mark forming surface on which the mark is formed adjacent to a rear end side of the front end side facing surface, and wherein a length of the coating material in a direction perpendicular to the axial direction along the mark forming surface is longer than a length in the axial direction along the mark forming surface.

According to this configuration, a covering area of the coating material can be increased without increasing the length of the coating material in a direction toward the front end side facing surface. Therefore, it is possible to prevent the coating material from adhering to the front end side facing surface at the time of application or drying of the coating material. In addition, since the covering area of the coating material can be increased, the oxide film or the metallic member forming the mark can be covered more reliably with the coating material.

<Application Example 10>

A method of manufacturing an internal combustion engine component, a part the component being composed of a metallic member, the method comprising: a preparation step of preparing the metallic member; a marking step of irradiating a surface of the metallic member with a laser beam to form a mark, the mark being formed of an oxide film or being formed of the metallic member and the oxide film; and a coating step of applying a coating material allowing transmission of light so as to cover the whole mark.

According to this configuration, since the mark is formed of the oxide film generated on the surface of the metallic member or is formed of the metallic member and the oxide film, it is possible to prevent a decrease in strength of a member to which the mark is attached, as compared with a case where the mark is attached to a ceramic member.

Further, since the oxide film or the metallic member forming the mark is covered with the coating material, it is possible to prevent rusting by touching the open air. Therefore, the oxide film or the metallic member can be prevented from discoloring due to rust or the like, and a readability of the mark can be prevented from decreasing. As a result, it is possible to prevent the decrease in the strength of the member to which the mark is attached while ensuring the readability of the mark.

The coating material is formed of a material through which light can pass. The light at this time may include light having various wavelengths. For example, infrared rays, visible light, and ultraviolet rays may be included. In a case the mark is visually confirmed, a material capable of transmitting visible light may be used. In a case the mark is read by a code reader and confirmed, a material capable of transmitting light that can be read by the code reader may be used.

<Application Example 11>

The method of manufacturing an internal combustion engine component according to the application example 10, wherein the internal combustion engine component is a spark plug configured to ignite an air-fuel mixture in an internal combustion engine.

According to this configuration, it is possible to prevent the decrease in the strength of the member attached with the mark formed on the metallic member forming a part of the spark plug while ensuring the readability of the mark.

<Application Example 12>

The method of manufacturing the internal combustion engine component according to the application example 11, the internal combustion engine component being a spark plug, the spark plug extending in an axial direction from a front end side to a rear end side and comprising a projection portion projecting radially outward over the entire circumference thereof, the projection portion having: a front end side facing surface that is locked directly or via a gasket to the engine head when being assembled to an engine; and a mark forming surface on which the mark is formed adjacent to a rear end side of the front end side facing surface, wherein the coating step is performed in a state in which the front end side facing surface faces vertically upward.

According to this configuration, even though the coating material hangs vertically downward due to its own weight in the coating step, it is possible to prevent the coating material from adhering to the front end side facing surface. As a result, airtightness between the engine head and the front end side facing surface can be ensured.

<Application Example 13>

The method of manufacturing the internal combustion engine component according to the application example 13, the internal combustion engine component being a spark plug, the spark plug extending in an axial direction from a front end side to a rear end side and comprising a metal shell having a projection portion projecting radially outward over the entire circumference thereof, the projection portion having: a front end side facing surface that is locked directly or via a gasket to the engine head; and a mark forming surface on which the mark is formed adjacent to a rear end side of the front end side facing surface, wherein the coating step is performed in a state in which the mark forming surface faces vertically upward.

According to this configuration, in the coating step, it is possible to prevent the coating material from hanging toward the front end side facing surface due to its own weight. As a result, airtightness between the engine head and the front end side facing surface can be ensured.

Further, according to this configuration, since the coating material spreads substantially uniformly along the mark forming surface by its own weight in the coating step, it is possible to prevent the thickness of a part of the coating material that is disposed on the mark from being non-uniform. As a result, readability of the mark can be improved.

DETAILED DESCRIPTION OF THE INVENTION

Illustrative modes of the present disclosure will be described below.

Figure 1:
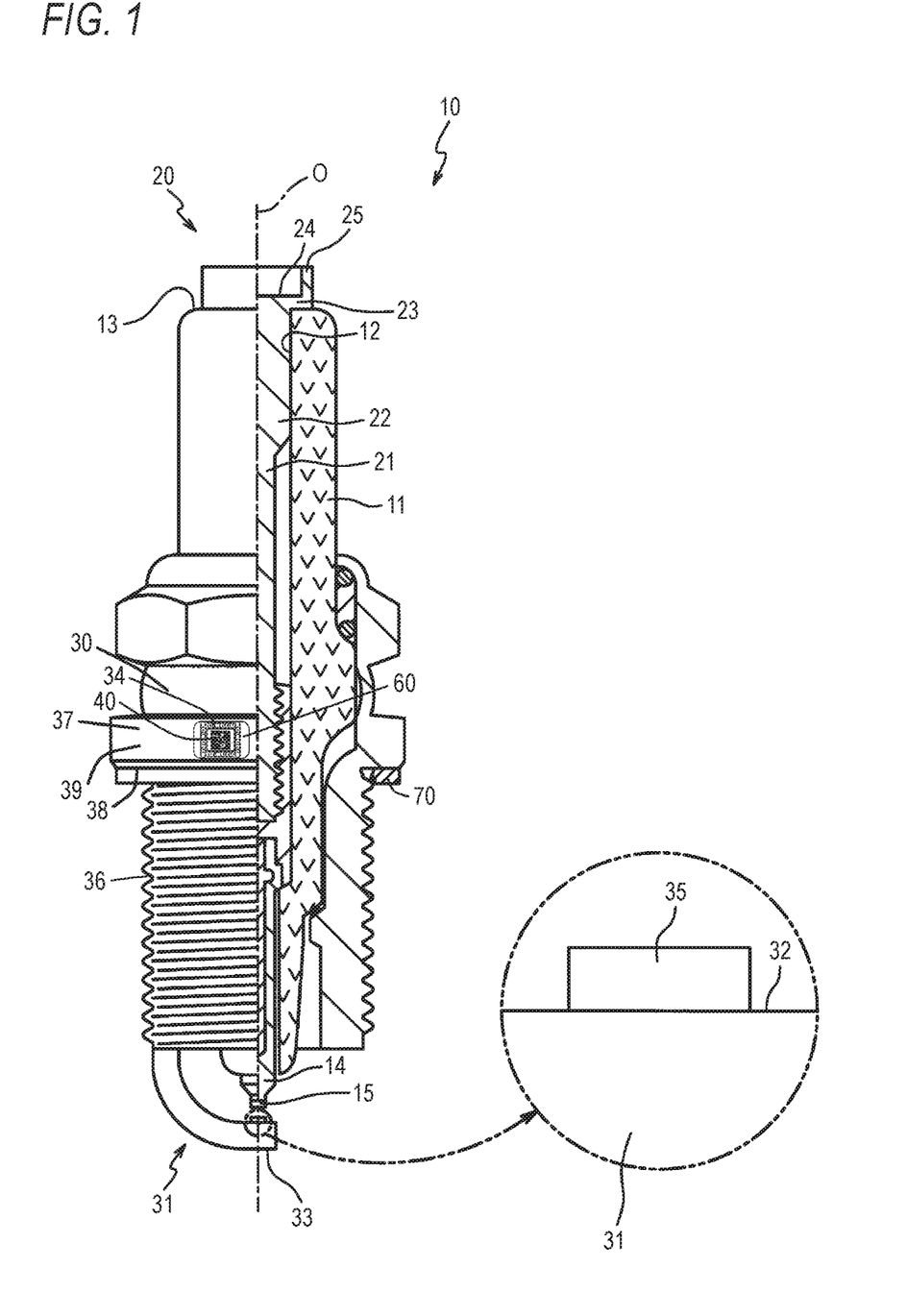
FIG. 1 is a one side sectional view of a spark plug in a first illustrative embodiment.

A. First Illustrative Embodiment:

Hereinafter, a first illustrative embodiment of the present disclosure will be described. FIG. 1 is a one side sectional view of a spark plug 10 in the first illustrative embodiment. In FIG. 1, a lower side of a drawing sheet is referred to as a front end side of the spark plug 10, and an upper side of the drawing sheet is referred to as a rear end side of the spark plug 10. The spark plug 10 is configured to ignite an air-fuel mixture in an internal combustion engine (not shown). The spark plug 10 includes an insulator 11, a metal terminal 20, a metal shell 30, and a ground electrode 31.

The insulator 11 is a cylindrical member formed from alumina or the like having excellent mechanical property and insulation property at high temperature. The insulator 11 has an axial hole 12 formed so as to penetrate along an axis O. A center electrode 14 is disposed on the front end side of the axial hole 12.

The center electrode 14 is a rod-like member extending along the axis O. The center electrode 14 is obtained by coating, with nickel or a nickel-based alloy, a core material made from copper or a core material containing copper as a main component. The center electrode 14 is held by the insulator 11. The center electrode 14 has a front end exposed from the axial hole 12. A tip 15 containing a noble metal is joined to a front end of the center electrode 14.

A metal terminal 20 is a rod-like member to which a high-voltage cable (not shown) is connected. The metal terminal 20 is formed from a conductive metal material (for example, low-carbon steel). The metal terminal 20 is connected to a shaft portion 21 inserted into the axial hole 12, a fixing portion 22 fitting in the axial hole 12, and a head portion 23 abutting against a rear end surface 13 of the insulator 11. The head portion 23 is formed in a disk shape. An outer diameter of the head portion 23 is larger than an outer diameter of the shaft portion 21. The head portion 23 is provided with a cylindrical wall portion 25 surrounding an end face 24 in a direction of the axis O of the metal terminal 20.

In the present illustrative embodiment, in order to improve corrosion resistance of the metal terminal 20, nickel plating is applied to the metal terminal 20. A height T of the wall portion 25 in the direction of the axis O from the end face 24 is set to, for example, 2 mm or less.

The metal shell 30 is a substantially cylindrical member formed from a conductive metal material (for example, low-carbon steel). In the metal shell 30, a surface layer portion is formed of a zinc plating film or a nickel plating film (not shown) by zinc plating or nickel plating. The metal shell 30 is swaged and fixed to a front end side of an outer periphery of the insulator 11 with an interval in the direction of the axis O from the head portion 23 of the metal terminal 20.

The metal shell 30 has a male screw 36 that is screwed to a female screw of an engine head (not shown) of the internal combustion engine on an outer peripheral surface of the metal shell 30. The metal shell 30 has a projection portion 37 projecting radially outward on a rear end side of the male screw 36.

The projection portion 37 has a front end side facing surface 38 that is locked directly or via a gasket 70 to the engine head when threaded onto the engine head of the internal combustion engine. The projection portion 37 has a mark forming surface 39, which is adjacent to a rear end side of the front end side facing surface 38, and on which a mark 40 formed of an oxide film or formed of the oxide film and a surface of the metal shell 30 is formed.

The surface of the metal shell 30 corresponds to "a surface of the metallic member" in the claims.

The ground electrode 31 is a rod-shaped member made of metal (for example, made of a nickel-based alloy). The ground electrode 31 has a first portion 32 located on the front end side and a second portion 33 on a back side of the first portion 32.

In the ground electrode 31, a tip 35 containing a noble metal is joined to the first portion 32. In the present illustrative embodiment, the front end side of the ground electrode 31 is bent, and the first portion 32 faces the center electrode 14 (tip 15). A spark gap is formed between the tip 35, which is joined to the first portion 32, and the center electrode 14 (tip 15).

The spark plug 10 is manufactured by the following method, for example. First, the center electrode 14 where the tip 15 is joined to the front end in advance is inserted into the axial hole 12 of the insulator 11, and is disposed such that a front end of the center electrode 14 is exposed from the axial hole 12 to the outside. The shaft portion 21 of the metal terminal 20 is inserted into the shaft hole 12 to ensure the conduction between the metal terminal 20 and the center electrode 14, and then the metal shell 30 to which the ground electrode 31 is joined in advance is assembled to the outer periphery of the insulator 11. The tip 35 is joined to the ground electrode 31, and then the ground electrode 31 is bent such that the tip 35 faces the center electrode 14 (tip 15) to obtain the spark plug 10.

Figure 2:
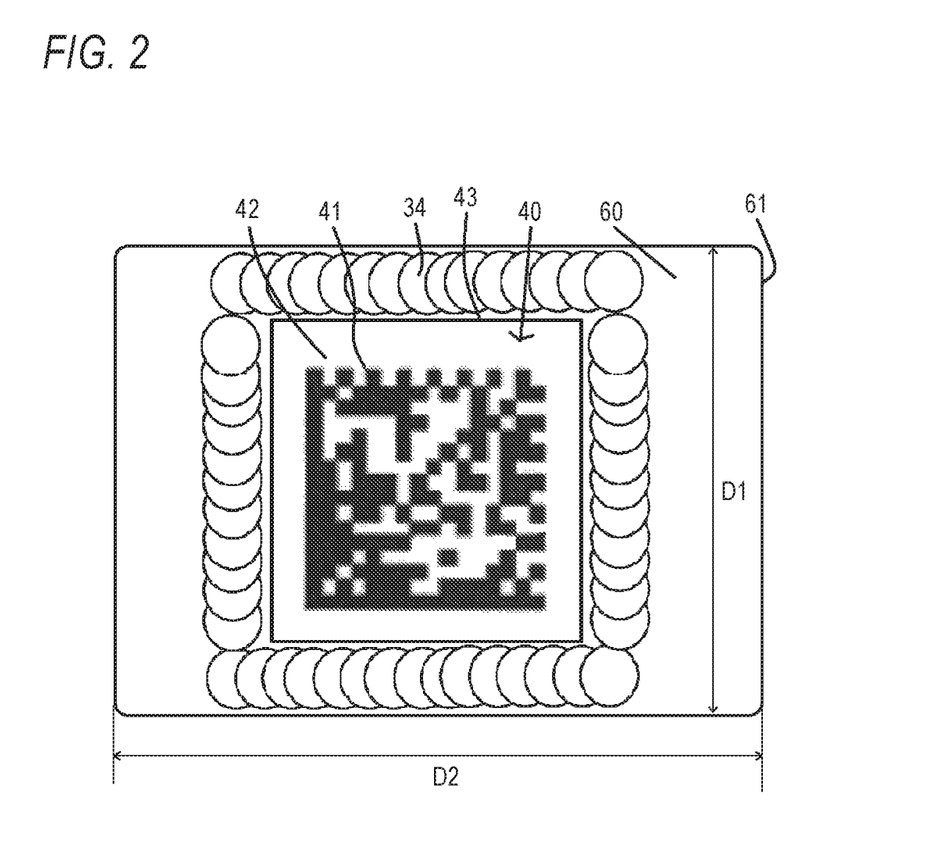
FIG. 2 is a side view of the spark plug in the vicinity of a mark in the first illustrative embodiment.

FIG. 2 is a side view of the spark plug 10 in which the vicinity of the mark in FIG. 1 is enlarged. The mark 40 is formed on the mark forming surface 39 of the projection portion 37 of the metal shell 30. In the present illustrative embodiment, the mark 40 is a two-dimensional code. Examples of the two-dimensional code include PDF 417, Micro PDF 417, CODE 49, Maxicode, Data Matrix, QR code, and Aztec. Incidentally, it is naturally possible to form a one-dimensional code on the metal terminal 20.

The mark 40 includes a first portion 41 that is a set of rectangular cells, and a second portion 42 covering a periphery of the first portion 41 and having a reflectivity higher than that of the first portion 41. In the present illustrative embodiment, the first portion 41 is a dark module, and the second portion 42 is a bright module. By combination of the first portion 41 and the second portion 42, history information unique to the product or component is displayed. A quiet zone 43, which is an edge portion of the mark 40, is a part of the second portion 42 having a higher reflectivity than that of the first portion 41.

In the present illustrative embodiment, the first portion 41 is an oxide film, and the second portion 42 is a surface (mark forming surface 39) of the projection portion 37 of the metal shell 30 which is a metallic member.

A coating material 60 is applied to the mark forming surface 39 so as to cover the whole mark 40. As the coating material 60, an anti-rust oil, a water repellent coating agent, a resin, or the like is applied. In the present illustrative embodiment, a UV cured resin that is cured by irradiation with ultraviolet rays (UV) is applied.

The coating material 60 is made of a material capable of transmitting light such that the reflected light of the light emitted to the mark 40 is read by a code reader. In the present illustrative embodiment, a colorless and transparent UV cured resin is used.

The coating material 60 covers the mark 40 such that an outermost edge 61 of the coating material 60 is wholly outside an outermost edge 43 of the mark 40.

An uneven portion 34 is formed on a periphery of the mark 40 on the mark forming surface 39 of the projection portion 37. In the first illustrative embodiment, the coating material 60 covers the mark forming surface 39 so as to cover the whole mark 40 and the whole uneven portion 34.

In the coating material, a length D2 in a direction perpendicular to the direction of the axis O along the mark forming surface 39 is longer than a length D1 in the direction of the axis O along the mark forming surface 39.

Referring to FIG. 3, a marking step of forming the mark 40 on the mark forming surface 39 of the projection portion 37, an uneven portion forming step of forming an uneven portion on the mark forming surface 39, and a coating step of applying the coating material 60 so as to cover the whole mark 40 and the whole uneven portion 34 will be described.

In FIG. 3, the marking step, the uneven portion forming step, and the coating step are described using a sectional view of the projection portion 37 of the metal shell 30. In the first illustrative embodiment, in the coating step, a spark plug (work in progress) during manufacturing is disposed such that the mark forming surface 39 is directed upward in a vertical direction. In FIG. 3, the upward direction of a paper surface is upward in the vertical direction, and a downward direction of the paper surface is downward in the vertical direction (gravity direction).

Figure 3A:
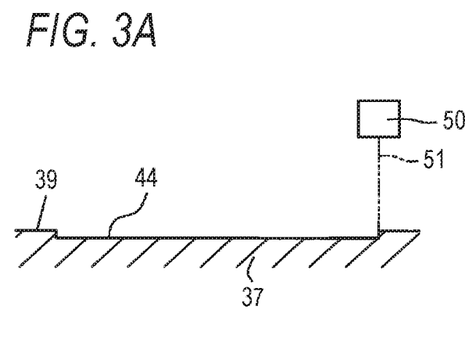
FIGS. 3A to 3F are explanatory views of a marking step, an uneven surface forming step, and a coating step.
Figure 3B:
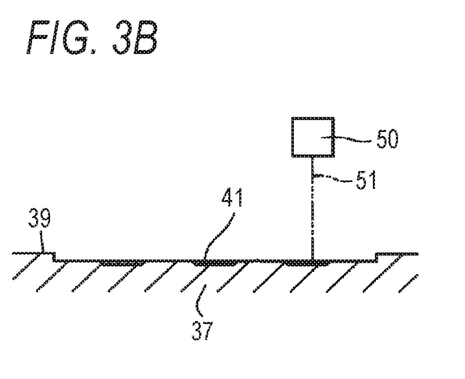
Figure 3C:
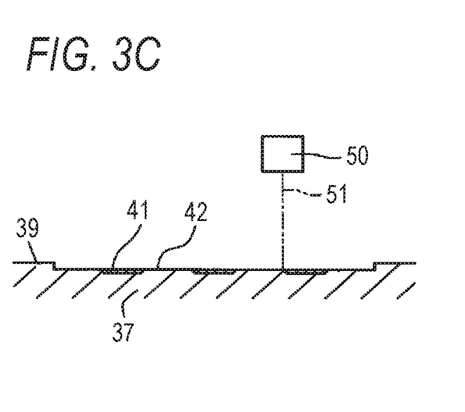

FIG. 3A is an explanatory diagram of a step in which a base region 44 is formed by irradiation with a laser beam 51 in the marking step. FIG. 3B is an explanatory diagram of a step in which the first portion 41 of the mark 40 is formed by irradiation with the laser beam 51 in the marking step. FIG. 3C is an explanatory diagram of a step of clarifying a boundary between the first portion 41 and the second portion 42 by irradiating the second portion 42 of the mark 40 with the laser beam 51 in the marking step.

Figure 3D:
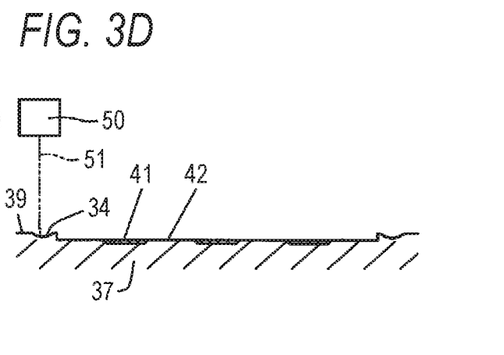

FIG. 3D is an explanatory diagram of the uneven portion forming step in which the uneven portion 34 is formed by irradiating the periphery of the mark 40 in the mark forming surface 39 with the laser beam 51.

Figure 3E:
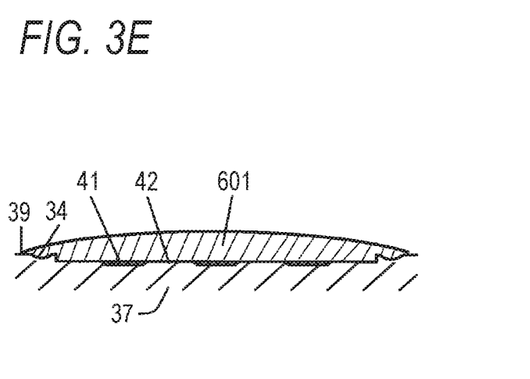
Figure 3F:
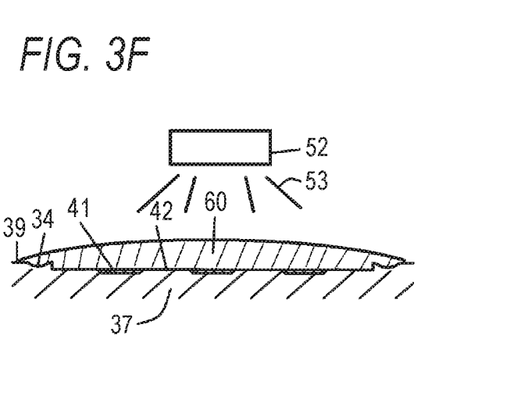

FIG. 3E is an explanatory diagram of a step of applying a liquid coating material 601 before curing to cover the whole mark 40 in the coating step. FIG. 3F is an explanatory diagram of a step of irradiation with UV 53 using a UV irradiation device 52 to form the liquid coating material 601 as a solid coating material 60 in the coating step.

In the step of FIG. 3A, the mark forming surface 39 is irradiated with the laser beam 51 emitted from the processing head 50 and a surface layer portion is removed to form the base region 44. Hereby, reflectivity in the base region can be made substantially constant, so that a reading performance of the mark can be improved. By relatively moving the processing head 50 along the mark forming surface 39 (see FIG. 1) and scanning the laser beam 51, the rectangular base region 44 (background) is formed in a portion where the mark 40 (see FIG. 2) is formed.

When the base region 44 is formed, laser output from the processing head 50 or a scanning speed, and a focal diameter, a focal depth, or the like of the laser beam 51 are adjusted to input sufficient energy necessary for removing the surface layer portion to the mark forming surface 39. This is to reduce new oxidation of the portion irradiated with the laser beam 51 as much as possible. As a result, the reflectivity can be increased while variation in shading of the background (base region 44) of the mark 40 is further reduced.

In the step of FIG. 3B, the base region 44 is irradiated with the laser beam 51 emitted from the processing head 50, and the base region 44 is partially heated. As a result, formation of the oxide film of a portion heated by irradiation with the laser beam 51 is promoted. By relatively moving the processing head 50 along the mark forming surface 39 and scanning the laser beam 51, the first portion 41 is formed.

When the first region 41 is formed, the laser output from the processing head 50 or the scanning speed, and the focal diameter, the focal depth, or the like of the laser beam 51 are adjusted to input energy higher than that when the base region 44 is formed to the mark forming surface 39. Accordingly, oxidation of the portion irradiated with the laser beam 51 is promoted, and the oxide film is formed and blackened on the first portion 41.

Since a degree of oxidation of the first portion 41 can be controlled by the laser output, a thickness or density of the oxide film of the first portion 41 can be made substantially uniform.

Further, since the first portion 41 is formed on the base region 44 having a small variation in shading, unevenness of the first portion 41 can be eliminated and contrast of the first portion 41 can be increased compared with a case where the first portion 41 is directly formed on the mark forming surface without forming the base region 44.

In the step of FIG. 3C, a portion not irradiated with the laser beam 51 is irradiated with the laser beam 51 emitted from the processing head 50 in the step of FIG. 3B, and an oxide film generated in a contour portion of the second portion 42 is removed under a thermal effect when the first portion 41 is formed. By relatively moving the processing head 50 along the mark forming surface 39 and scanning the laser beam 51, the boundary between the first portion 41 and the second portion 42 is formed.

In the step of FIG. 3C, the laser output from the processing head 50 or the scanning speed, and the focal diameter, the focal depth, or the like of the laser beam 51 are adjusted to input energy equivalent to that when the base region 44 is formed. Dirt of the second portion 42 generated when the first portion 41 is formed can be removed. Therefore, contrast between the first portion 41 and the second portion 42 can be increased while improving dimensional accuracy of the first portion 41 and the second portion 42.

In the step of FIG. 3D, the laser beam 51 emitted from the processing head 50 is input to a portion of the mark forming surface about the mark 40 to form the uneven portion 34. At this time, energy is input by adjusting the focal diameter, the focal depth, or the like of the laser beam 51 so as to have a reflectivity different from the reflectivity of the first portion 41 or the second portion 42 of the mark 40. In the present illustrative embodiment, energy is input at a focal diameter larger than the focal diameter in the marking step or a focal depth deeper than the focal depth in the marking step. This makes it possible to adversely affect reading of the mark 40 in a code reader since the reflectivity is not uniform in the uneven portion 34.

In the step of FIG. 3E, a step of applying the liquid coating material 601 before curing by UV is shown. In the present illustrative embodiment, the work in progress is disposed such that the mark forming surface 39 faces vertically upward. Hereby, the liquid coating material 601 spreads substantially uniformly due to its own weight. The liquid coating material 601 covers the whole mark 40 and is applied so as to cover the whole uneven portion 34 formed in FIG. 3D.

In the step of FIG. 3F, a UV irradiation step is shown in which the liquid coating material 601 before curing is irradiated with UV 53 using the UV irradiation device 52 to form the solid coating material 60.

Figure 4A:
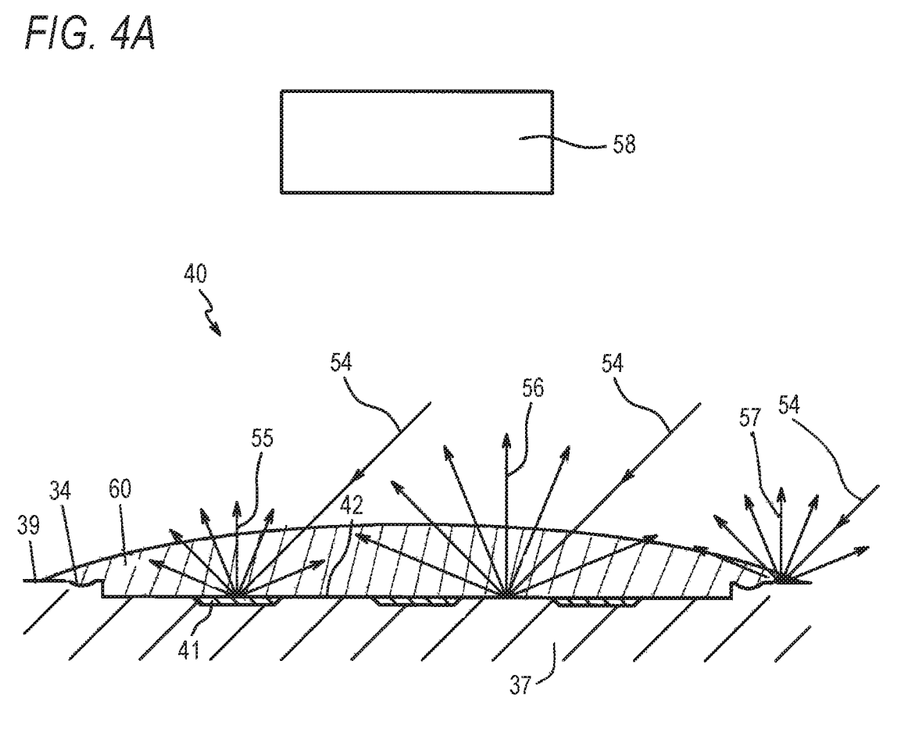
FIG. 4A is a schematic view of reflected light of the mark.

Next, reflected light of the mark 40 will be described with reference to FIG. 4. FIG. 4A is a schematic diagram of the reflected light of the mark 40. Reading of the mark 40 is performed by irradiating the mark 40 with illumination light 54 and detecting reflected light 55, 56, and 57 reflected by the mark 40 by a light receiving element 58. The light receiving element 58 is a part of an imaging sensor such as a CCD or a CMOS having a condenser lens, a color filter, or the like. Since the first portion 41 absorbs more illumination light 54 than the second portion 42, the light receiving element 58 can receive more reflected light 56 of the second portion 42 than the reflected light 55 of the first portion 41.

Figure 4B:
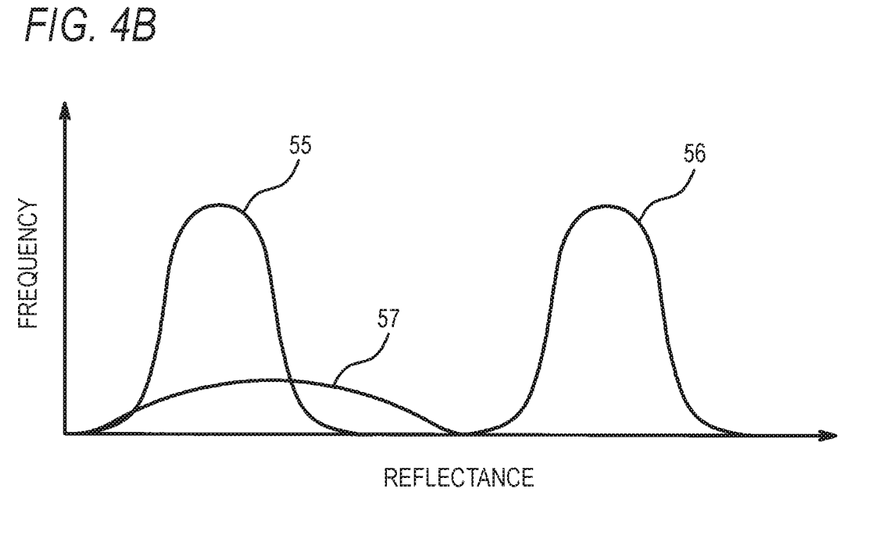
FIG. 4B is a schematic diagram of distribution of reflectivity detected by a light receiving element that receives the reflected light from the mark.

FIG. 4B is a schematic diagram of distribution of the reflectivity detected by the light receiving element 58 receiving the reflected light 55 and 56 of the mark 40, and distribution of reflectivity values representing an amount of light received by individual pixels of the light receiving element 58 is schematically illustrated. In FIG. 4B, the reflectivity is taken as a horizontal axis, and the number of pixels (frequency) of the light receiving element 58 that has detected light is taken as a vertical axis.

In the spark plug of the first illustrative embodiment, as shown in FIG. 4B, variation in reflectivity distribution of the reflected light 55 of the first portion 41 can be made smaller than variation in reflectivity distribution of the reflected light 57 in a portion about the mark 40. Variation in reflectivity distribution of the reflected light 56 of the second portion 42 can be made smaller than the variation in the reflectivity distribution of the reflected light 57 about the mark 40. This is because a degree of oxidation of a surface of the first portion 41 or a surface state of the second portion 42 and the uneven portion 34 can be controlled by adjusting the laser output or the like.

The reflectivity of the reflected light 56 of the second portion 42 is higher than the reflectivity of the reflected light 55 of the first portion 41. Therefore, by setting a reflectivity value between the distribution of the reflected light 56 and the distribution of the reflected light 55 as a threshold, the first portion 41 (dark module) and the second portion 42 (bright module) can be accurately read as compared with a case where the variation in the reflectivity distribution of the second portion 42 is not reduced. As a result, a reading rate by the light receiving element 58 can be secured and prevented from misreading.

According to the spark plug 10 of the first illustrative embodiment, since the mark 40 is formed of the first portion 41 (oxide film) and the second portion 42 (surface of metal shell 30), it is possible to prevent a decrease in strength of a member to which the mark is attached as compared with a case where the mark is attached to a ceramic member.

Further, since the first portion 41 (oxide film) or the second portion 42 (surface of metal shell 30) forming the mark 40 are covered with the coating material 60, it is possible to prevent the first portion 41 or the second portion 42 from rusting by touching the open air. As a result, the first portion 41 (oxide film) or the second portion (surface of metallic member) can be prevented from discoloring due to rust or the like, and the reading performance of the mark 40 can be prevented from decreasing. Therefore, it is possible to prevent the decrease in the strength of the member to which the mark 40 is attached while ensuring the reading performance of the mark 40.

Further, according to the spark plug 10 of the first illustrative embodiment, since the first portion 41 (oxide film) and the second portion 42 (surface of metal shell 30) forming the mark 40 are more reliably covered by the coating material 60, the first portion 41 (oxide film) or the second portion (surface of metallic member) can be further prevented from discoloring due to rust or the like, and the reading performance of the mark 40 can be further prevented from decreasing. As a result, it is possible to prevent the decrease in the strength of the member to which the mark 40 is attached while ensuring the reading performance of the mark 40.

Furthermore, according to the spark plug 10 of the first illustrative embodiment, a covering area of the coating material 60 can be increased without increasing the length of the coating material 60 in a direction toward the front end side facing surface 34. Therefore, it is possible to prevent the coating material 60 from adhering to the front end side facing surface 38 at the time of application or drying of the coating material 60. In addition, since the covering area of the coating material 60 can be increased, the first portion 41 (oxide film) or the second portion 42 (surface of metal shell) forming the mark 40 can be covered more reliably with the coating material 60.

According to the spark plug 10 of the first illustrative embodiment, it can be made hard to peel off the coating material by covering the uneven portion 34 with the coating material 60.

Furthermore, according to the spark plug 10 of the first illustrative embodiment, in the coating step, it is possible to prevent the coating material 60 from hanging toward the front end side facing surface 38 due to its own weight. As a result, airtightness between the engine head and the front end side facing surface 38 can be ensured.

Further, according to the spark plug 10 of the first illustrative embodiment, since the coating material 601 spreads substantially uniformly along the mark forming surface 39 by its own weight in the coating step, it is possible to prevent the thickness of the part of the coating material 601 that is disposed on the mark 40 from being non-uniform. As a result, the reading performance of the mark 40 can be improved.

Figure 5A:
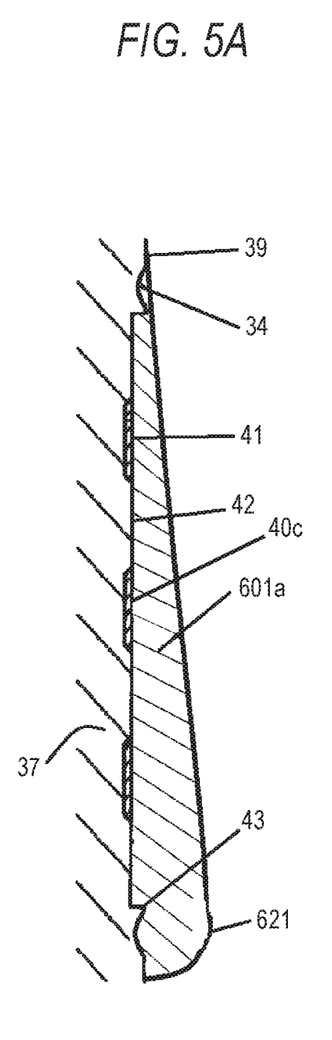
FIGS. 5A and 5B are explanatory views of the coating step in a second illustrative embodiment.
Figure 5B:
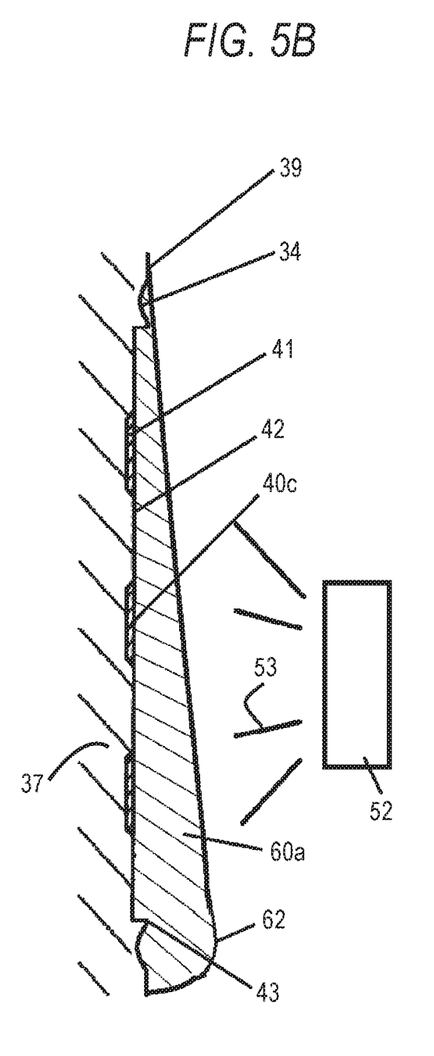

B. Second Illustrative Embodiment:

Hereinafter, a second illustrative embodiment of the present disclosure will be described with reference to FIGS. 5A and 5B. FIGS. 5A and 5B are explanatory views of the coating step in the second illustrative embodiment.

A difference from the first illustrative embodiment is that the work in progress in the application step of applying the coating material is disposed such that the front end side facing surface 38 faces upward vertically. Other configurations are the same as those of the first illustrative embodiment. It may be understandable by comparing FIGS. 3E and 3F and FIGS. 5A and 5B, respectively, for example. In FIGS. 5A and 5B, an upper side of a paper surface is upward in the vertical direction, and a lower side of the paper surface is downward in the vertical direction (gravity direction). That is, although omitted in FIGS. 5A and 5B, the front end side facing surface 38 is present on the upper side of FIGS. 5A and 5B.

Unlike the first illustrative embodiment, in the liquid coating material 601a before curing in the second illustrative embodiment, a maximum thickness part 621 whose thickness is maximum is located on a rear end side of a center 40c of the mark 40 in a direction along the mark forming surface 39. The maximum thickness part 621 of the coating material 601a whose thickness is maximum is outside an outermost edge 43 of the mark 40 in the direction along the mark forming surface 39.

Unlike the first illustrative embodiment, even in the coating material 60a after curing in the second illustrative embodiment, a maximum thickness part 62 whose thickness is maximum is located on a rear end side of a center 40c of the mark 40 in a direction along the mark forming surface 39. The maximum thickness part 62 of the coating material 60a whose thickness is maximum is outside an outermost edge 43 of the mark 40 in the direction along the mark forming surface 39.

According to the spark plug 10a of the second illustrative embodiment, since the maximum thickness part 621 of the liquid coating material 601a is disposed at a relatively distant position from the front end side facing surface 38 that is a locking surface with the engine head, the coating material 601a is prevented from adhering to the front end side facing surface 38 at the time of application or drying of the coating material 601a. As a result, airtightness between a plug hole and the front end side facing surface 38 can be ensured.

Further, according to the spark plug 10a of the second illustrative embodiment, variation in a thickness of the portion of the coating material 60a disposed on the mark 40 can be reduced as compared with a case where the maximum thickness portions 62 and 621 are inside the outermost edge 43 of the mark 40. Therefore, visibility of the mark 40 can be further improved.

Figure 6:
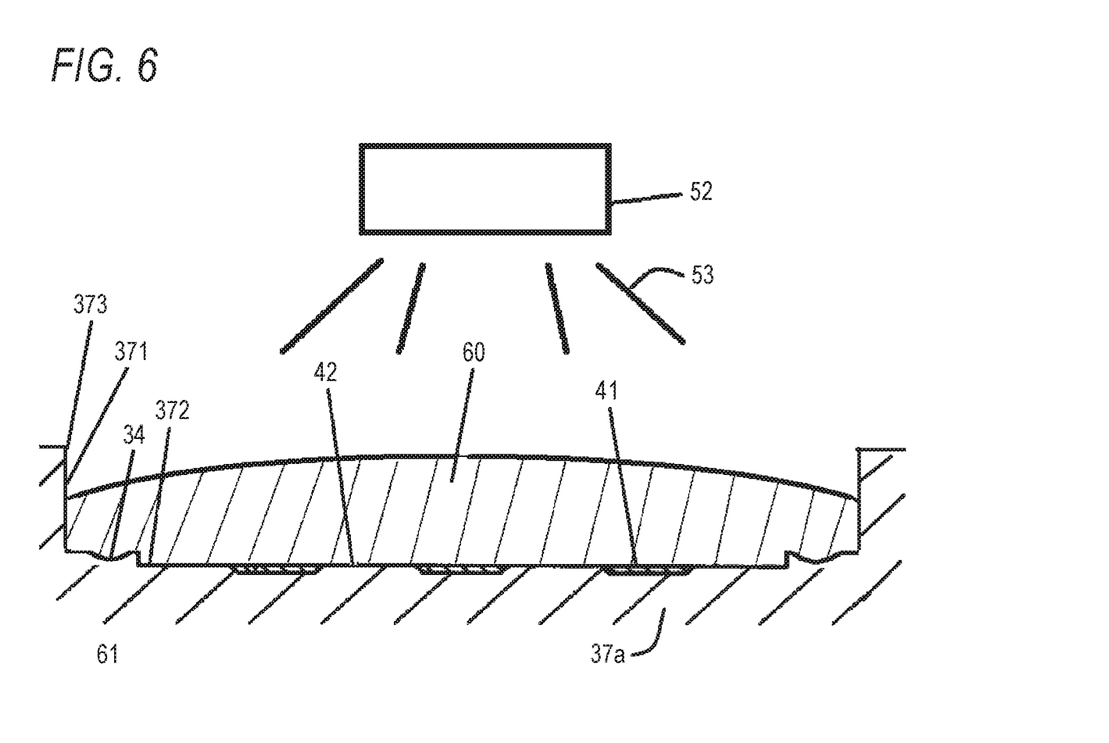
FIG. 6 is an explanatory view of the coating step in a third illustrative embodiment.

C. Third Illustrative Embodiment:

Hereinafter, a third illustrative embodiment of the present disclosure will be described with reference to FIG. 6. FIG. 6 is an explanatory view of the coating step in the third illustrative embodiment.

The third illustrative embodiment is different from the first illustrative embodiment in that a caved portion 371 is formed in a projection portion 37a. Other configurations are the same as those of the first illustrative embodiment. It may be understandable by comparing FIG. 3F and FIG. 6, for example. A mark is formed on a bottom surface 372 of the caved portion 371 (the bottom surface 372 of the caved portion 371 corresponds to the mark forming surface 39). Further, the outermost edge 62 of the coating material 60 is located inside an outermost edge 373 of the caved portion 371.

According to the spark plug 10b of the third illustrative embodiment, since the coating material 60 covers the mark 40 formed on the bottom surface 372 of the caved portion 371, it can be made hard to peel off the coating material 60 as compared with a case where the coating material 60 is applied to a plane.

According to the spark plug 10b of the third illustrative embodiment, an application range of the coating material 60 can be determined by the caved portion 371 as compared with a case where the coating material 60 is disposed by spreading in a plane.

D. Modification:

In the present illustrative embodiment, the mark 40 is a two-dimensional code, but may be a one-dimensional barcode. Further, the mark 40 may not be a code, but a sign for visual confirmation (a round, a triangle, a square, a star, a logo, or the like).

In the present illustrative embodiment, the UV cured resin is used as the coating materials 60 and 60a, but a thermosetting resin or a resin that hardens with time may be used. In that case, instead of the UV irradiation device 52, the liquid coating material 601a before curing can be cured by using a heating device or a blowing device.

Further, the coating materials 60 and 60a may be in a liquid form such as an anti-rust oil. In this case, a step of curing the liquid coating materials 601 and 601a is omitted, and coating configuration is completed when the liquid coating materials 601 and 601a are applied.

Further, in the present illustrative embodiment, a colorless and transparent material is used as the coating materials 60 and 60a, but the present disclosure is not limited thereto. The coating materials 60 and 60a only needs to be able to transmit light emitted from the code reader. For example, a slightly colored semi-transparent material may be used. In a case the code reader is configured to read reflected light of ultraviolet rays or infrared rays, the coating materials 60 and 60a may be a material that cannot transmit visible light.

In the present illustrative embodiment, the surface of the projection portion 37 of the metal shell 30 is set as the mark forming surface 39, but may be a surface of another metallic member. Examples of the metallic member used in the spark plug include the ground electrode 31, the center electrode 14, and the metal terminal 20. The mark 40 may be formed on these surfaces.

In the present illustrative embodiment, the first portion 41 is set as a dark module and the second portion 42 is set as a bright module, but also the first portion 41 may be set as a bright module and the second portion 42 may be set as a dark module. This can be realized by interchanging laser conditions of FIG. 3A and laser conditions of FIG. 3B.

Although the oxide film is used as the first portion 41 and the surface of the metallic member is used as the second portion 42 in the present illustrative embodiment, the first portion 41 and the second portion 42 may be formed of the oxide film. In this case, brightness of the first portion 41 and the second portion 42 may be adjusted by changing an oxidation state.

As in the present illustrative embodiment, it is preferable that the coating materials 60 and 60*a* cover the whole mark 40 and the whole uneven portion 34. However, it is not always necessary that the coating materials 60 and 60*a* cover the whole uneven portion 34. This is because there is an effect of preventing the coating materials 60 and 60*a* from peeling even though the coating materials 60 and 60*a* cover at least a part of the uneven portion 34.

The method of manufacturing the spark plug of the present illustrative embodiment includes the uneven portion forming step, but the uneven portion forming step may be omitted. The uneven portion forming step may be performed before the marking step.

In the method of manufacturing the spark plug of the present illustrative embodiment, as the marking step, the step of FIG. 3C is included in which the boundary between the first portion 41 and the second portion 42 is made vivid, but the step can also be omitted. This is because, if the oxide film can be formed accurately in the step of FIG. 3B, it is not necessary to remove the oxide film generated in the contour portion of the second portion 42 under a heat influence when the first portion 41 is formed.

In the present illustrative embodiment, the spark plug of the internal combustion engine component has been described, but the internal combustion engine component forming a part of the metallic member includes a glow plug for a diesel engine used for the purpose of assisting ignition of light oil, an oxygen sensor that measures an oxygen concentration of exhaust gas discharged from the internal combustion engine, or the like, and the present disclosure may be applied to these internal combustion engine components.

Although the present invention has been described based on the illustrative embodiments and the modification, the illustrative embodiments of the invention described above are to facilitate understanding of the present invention and do not limit the present invention. The present invention can be modified and improved without departing from the scope of claims, and includes equivalents thereof.

What is claimed is:

1. A spark plug configured to ignite an air-fuel mixture in an internal combustion engine, said spark plug comprising:
    a metallic member;
    a mark formed of an oxide film generated on a surface of the metallic member or formed of the metallic member and the oxide film; and
    a coating material covering the whole mark and allowing transmission of light.

2. The spark plug according to claim 1, wherein an outermost edge of the coating material on the surface of the metallic member is located outside of an outermost edge of the mark.

3. The spark plug according to claim 1, wherein an uneven portion is provided about the mark in the surface of the metallic member, and the coating material covers the uneven portion.

4. The spark plug according to claim 1,
    wherein a caved portion is formed on the surface of the metallic member, and
    wherein the mark is formed on a bottom surface of the caved portion.

5. The spark plug according to claim 4, wherein an outermost edge of the coating material is located inside an outermost edge of the caved portion.

6. The spark plug according to claim 1,
    wherein the spark plug extends in an axial direction from a front end side to a rear end side and comprises a metal shell having a projection portion projecting radially outward over the entire circumference thereof,
    wherein the projection portion has:
        a front end side facing surface that is locked directly or via a gasket to an engine head when being assembled to an engine; and
        a mark forming surface on which the mark is formed adjacent to a rear end side of the front end side facing surface, and
    wherein a maximum thickness part of the coating material is located on a, rear end side of a center of the mark in a direction along the mark forming surface, a thickness of the coating material being maximum at the maximum thickness part.

7. The spark plug according to claim 1,
    wherein the spark plug extends in an axial direction from a front end side to a rear end side and comprises a projection portion projecting radially outward over the entire circumference thereof,
    wherein the projection portion has:
        a front end side facing surface that is locked directly or via a gasket to an engine head when being assembled to an engine; and
        a mark forming surface on which the mark is formed adjacent to a rear end side of the front end side facing surface, and
    wherein a maximum thickness part of the coating material is located outside an outermost edge of the mark in a direction along the mark forming surface, a thickness of the coating material being maximum at the maximum thickness part.

8. The spark plug according to claim 1,
    wherein the spark plug extends in an axial direction from a front end side to a rear end side and comprises a projection portion projecting radially outward over the entire circumference thereof,
    wherein the projection portion has:
        a front end side facing surface that is locked directly or via a gasket to an engine head; and
        a mark forming surface on which the mark is formed adjacent to a rear end side of the front end side facing surface, and
    wherein a length of the coating material in a direction perpendicular to the axial direction along the mark forming surface is longer than a length in the axial direction along the mark forming surface.

9. A method of manufacturing a spark plug configured to ignite an air-fuel mixture in an internal combustion engine, a part of said spark plug being composed of a metallic member, wherein said method comprises:
    a preparation step of preparing the metallic member;
    a marking step of irradiating a surface of the metallic member with a laser beam to form a mark, the mark being formed of an oxide film or being formed of the metallic member and the oxide film; and
    a coating step of applying a coating material allowing transmission of light so as to cover the whole mark.

10. The method of manufacturing the spark plug according to claim 9, the spark plug extending in an axial direction from a front end side to a rear end side and comprising a projection portion projecting radially outward over the entire circumference thereof, the projection portion having: a front end side facing surface that is locked directly or via a gasket to an engine head when being assembled to an engine; and a mark forming surface on which the mark is formed adjacent to a rear end side of the front end side facing surface,  wherein the coating step is performed in a state in which the front end side facing surface faces vertically upward.

11. The method of manufacturing the spark plug according to claim 9, the spark plug extending in an axial direction from a front end side to a rear end side and comprising a metal shell having a projection portion projecting radially outward over the entire circumference thereof, the projection portion having: a front end side facing surface that is locked directly or via a gasket to an engine head; and a mark forming surface on which the mark is formed adjacent to a rear end side of the front end side facing surface,  wherein the coating step is performed in a state in which the mark forming surface faces vertically upward.

\* \* \* \* \*